US008077338B2

(12) United States Patent  (10) Patent No.: US 8,077,338 B2
Ren et al. (45) Date of Patent: Dec. 13, 2011

(54) METHOD FOR ONLINE PRINTING DIGITAL PROJECT

(75) Inventors: Hong-Liang Ren, Hangzhou (CN); Fang-Ming Chen, Hangzhou (CN); Zhi-Jun Lou, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 855 days.

(21) Appl. No.: 12/071,823

(22) Filed: Feb. 27, 2008

(65) Prior Publication Data

US 2009/0213413 A1 Aug. 27, 2009

(51) Int. Cl.
  *G06F 15/00* (2006.01)
  *G06F 3/12* (2006.01)
  *G06K 1/00* (2006.01)
(52) U.S. Cl. ...................................... 358/1.15; 358/1.13
(58) Field of Classification Search .................... 358/1.1, 358/1.15, 1.13, 1.14, 1.16, 1.18
  See application file for complete search history.

(56) References Cited

U.S. PATENT DOCUMENTS

2004/0172407 A1* 9/2004 Arpirez Vega ............ 707/103 R
2009/0100096 A1* 4/2009 Erlichson et al. .......... 707/104.1

* cited by examiner

Primary Examiner — Douglas Tran
(74) Attorney, Agent, or Firm — Bacon & Thomas, PLLC

(57) ABSTRACT

A method for online printing a digital project includes the steps of: separating at least one image from a digital project template; replacing the digital project template with an executable file; encapsulating an executable code into the executable file; converting the image into at least one thumbnail; writing the executable file, the thumbnail, and related information into an image file; uploading the image file to a server via a network; extracting the image file by the server, so as to read out the executable file, the thumbnail, and the related information; reading a corresponding project template from a database of the server according to the executable code; attaching the thumbnail back to the project template according to the related information in the image file, so as to recover a preview image of the digital project and print the project image by a printer.

11 Claims, 6 Drawing Sheets

| Project Type | Paper Size | Contents | Pictures | Transferred Data Size (MB) | |
|---|---|---|---|---|---|
| | | | | Traditional | This invention |
| Photo Book | Letter, 8.5 x 11inch | Baby Boy Cloth Texture, 41 pages | 4MP x 82, 1MP x 22 | 272 | 24.2 |
| Half-Fold Greeting Card | Letter | Happy Holidays | 4MP x 1 | 2.65 | 0.44 |
| Quarter-Fold Greeting Card | Letter | Happy Holidays | 4MP x 1 | 1.58 | 0.36 |
| Album Page | Letter | Bloom, 5 pictures | 4MP x 5 | 3.27 | 0.86 |
| Calendar | Letter | Baby Girl, 26 pages | 4MP x 13 | 65.8 | 9.7 |
| Funhouse | Letter | Skateboard Girl | 4MP x 1 | 3.68 | 1.0 |
| Photo Print | 5 x 7 inch | 1 photo, without margins | 4MP x 1 | 2.39 | 0.89 |

FIG. 6

METHOD FOR ONLINE PRINTING DIGITAL PROJECT

FIELD OF THE INVENTION

The present invention relates to a method for printing a digital project, and more particularly to a method for online printing a digital project.

BACKGROUND OF THE INVENTION

Recently, with the advance of digitally photographic technologies, various electronic devices (such as digital camera, digital video camera, notebook computer, and mobile phone) provided with a digital image-capturing element are rapidly developed and improved. There is a trend to enhance the photographic quality of the electronic devices, minimize the volume thereof, and lower the selling price thereof. Therefore, the electronic devices are more and more popular in the market.

Due to the increasing popularization of the electronic devices having the image-capturing element, consumers pay more attention to application software for processing digital images. For example, referring FIG. 1, a popular digital-project software in the market is illustrated. As shown in FIG. 1, the digital-project software comprises a plurality of digital project templates 10, each of these digital project templates 10 is designed by professional designers according to different subjects, such as various cultures, scenes, festivals, anniversaries, and ambiances, so as to provide a suitable template having various images 11, texts 12, and a frame 13. The digital project template 10 as shown in FIG. 1 is designed according to Christmas (or New Year), wherein the frame 13 designed by the designer according thereto comprises a rectangular hollow window 131 with arc corners. Furthermore, the image 11 above the frame 13 represents celebratory flowers for decorating the frame 13, while the text 12 on a left lower part of the frame 13 shows "A Happy New Year" as blessing words of Christmas (or New Year). The electronic device screen displays an icon of the digital project template 10 for a user to click, in order to select a desired template processed by the digital-project software. In operation, the user can attach a desired image 20 to the selected template according to his/her favorite or need, so as to generate a processed project image 30, as shown in FIG. 2. Referring back FIG. 2, for some digital-project software, the user can further select to enter a paragraph of message 21 on the project image 30 for representing his/her special regards or blesses.

Generally, the user can edit and finish the project image 30 via the digital-project software on the electronic device. After this, the user will print the project image 30 by a printer. However, most of commercially personal printers only can provide insufficient printing qualities (such as color saturation and pixel resolution), so that the project image 30 printed therethrough can not completely provide the same qualities as the project image 30 showed on the display of the electronic device. As a result, there is an alternative method for the user to print the project image 30, wherein the project image 30 finished by the electronic device is firstly uploaded to a network server of a printer service provider via the Internet, and then the project image 30 will be printed by a professional high-level printer via the network server, so as to generate a digital project with higher color saturation and higher pixel resolution.

However, when the traditional electronic device uploads the project image 30 to the network server of the printer service provider, the digital project template 10, the image 20, and the message 21 in the project image 30 are integrated into an image file, and then the image file is uploaded to the network server, so that the project image 30 will be printed by the professional high-level printer via the network server. At this time, because the image file includes the digital project template 10 and the image 20, both of which have complicated content and huge data, it costs much time to upload the entire image file to the network server of the printer service provider, so that the online printing efficiency will be lowered, resulting in hardly carrying out through the online printing service.

As a result, it is important for designers and related manufacturers of online printing systems to think how to develop a method for online printing a digital project for users to speedily upload the digital project to a network server of a printer service provider when printing the digital project online, in order to substantially reduce the time of uploading the digital project online, for the purpose of efficiently enhancing the efficiency of online printing the digital project.

It is therefore tried by the inventor to develop a method for online printing a digital project to solve the problems existing in the conventional method for online printing the digital project that only provides insufficient online printing efficiency, as described above.

SUMMARY OF THE INVENTION

A primary object of the present invention is to provide a method for online printing a digital project, wherein the digital project is a project image comprising a digital project template and at least one image attached to the digital project template by a user via a digital electronic device, such as mobile phone or notebook computer and etc. The method comprises the steps of: separating the image from the digital project template; replacing the digital project template with a project engine file (i.e. an executable file) of a format defined by a project engine (also called PE hereinafter); encapsulating an executable code into the PE file, wherein the executable code is necessary for an operating system (also called OS hereinafter) to generate the digital project template; converting the image into at least one thumbnail according to a predetermined printing size or resolution; writing the PE file, the thumbnail, and related information into an image file of an exchangeable image file format (also called EXIF hereinafter), wherein the related information includes a corresponding size and a corresponding coordinate location of the image in relation to the digital project template; uploading the image file of EXIF to a server via a network; extracting the image file of EXIF by the server, so as to read out the PE file, the thumbnail, and the related information carried by the image file of EXIF; reading a corresponding digital project template from a database of the server according to the executable code of the PE file; attaching the thumbnail back to the digital project template according to the thumbnail and the related information in the image file of EXIF, so as to recover a preview image of the digital project; and printing the project image (i.e. the digital project) by a printer. As a result, the time of online uploading the digital project will be substantially reduced, and the efficiency of online printing the digital project will be efficiently enhanced.

BRIEF DESCRIPTION OF THE DRAWINGS

The method adopted by the present invention to achieve the above and other objects can be best understood by referring to the following detailed description of the preferred embodiments and the accompanying drawings, wherein:

FIG. 6 is a table of comparing the efficiency of the method of the present invention with that of the traditional method.

DETAILED DESCRIPTION OF THE PREFERRED EMBODIMENTS

Figure 1:
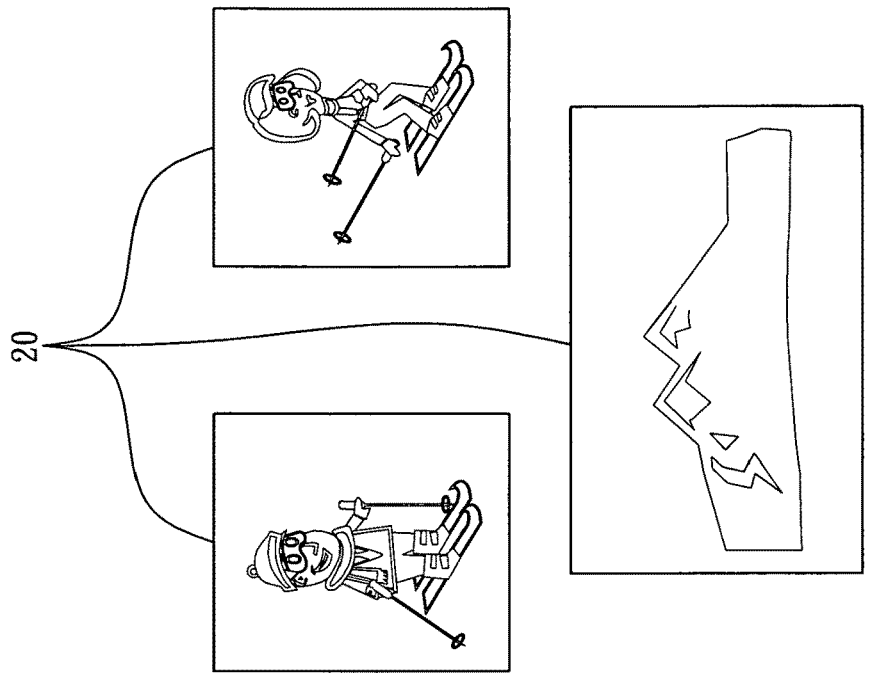
FIG. 1 is an operational view of a traditional digital-project software.
Figure 1:
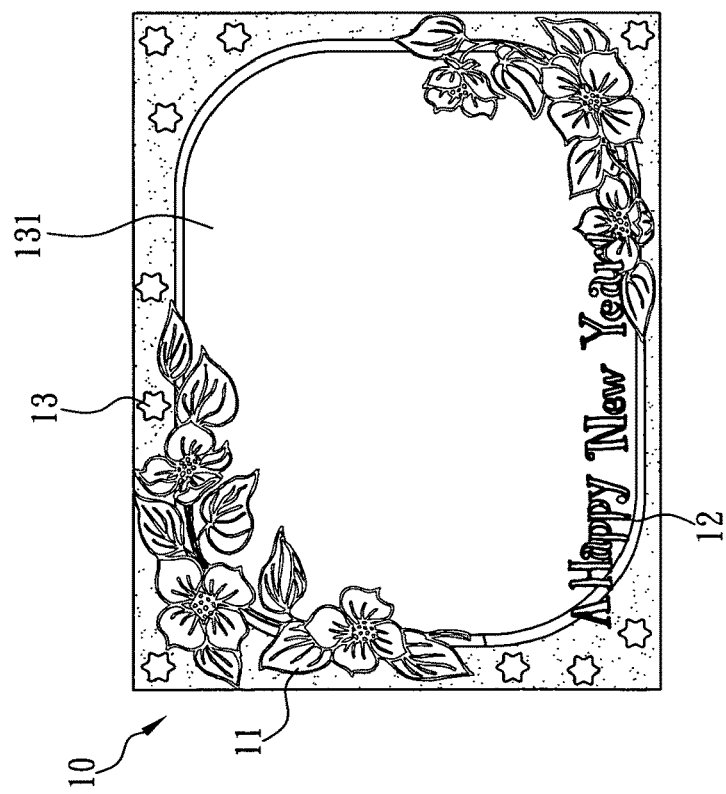
Figure 2:
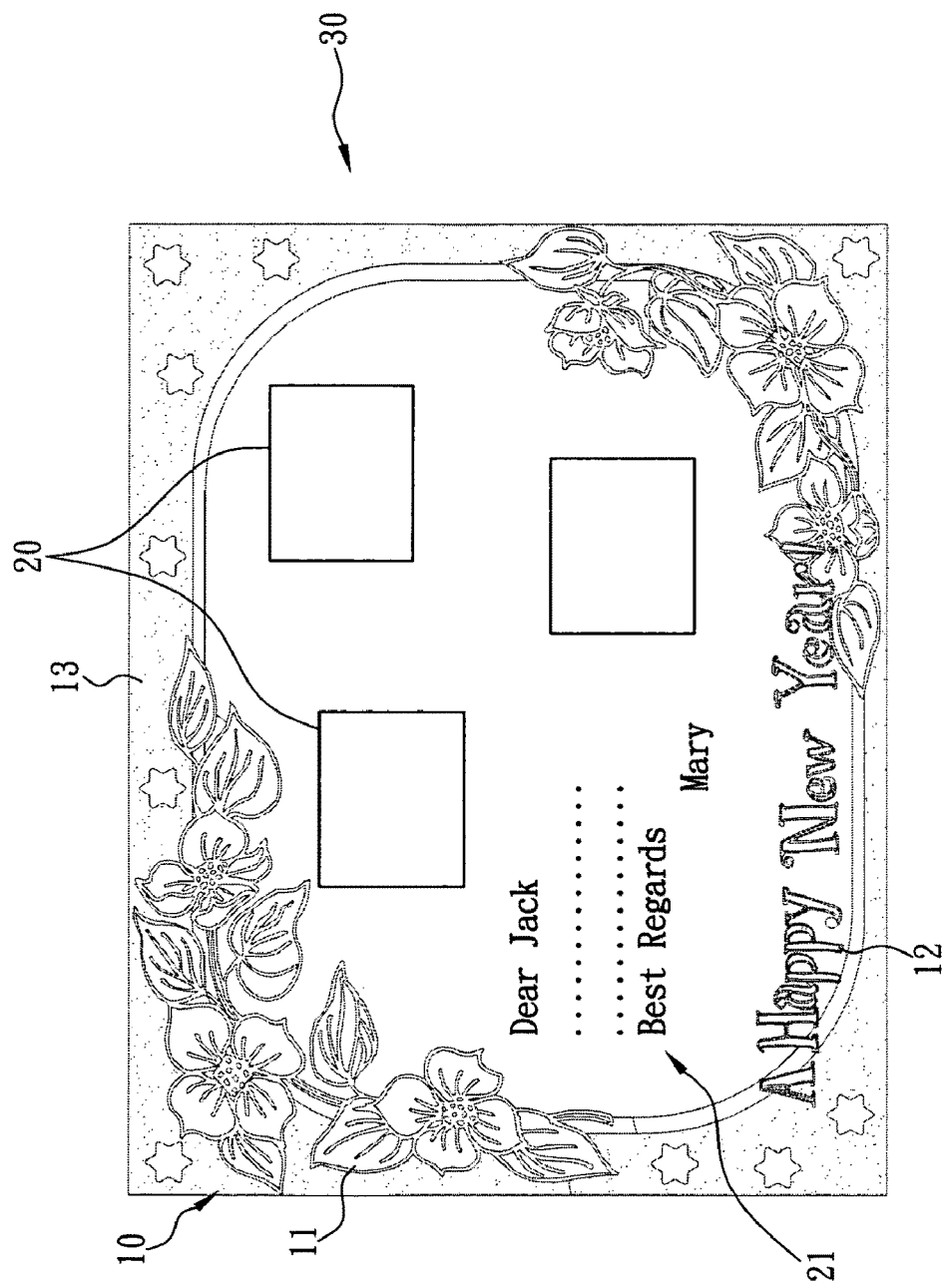
FIG. 2 is a schematic view of a project image generated by the traditional digital-project software as shown in FIG. 1.

A so-called "digital-project software" is a software for a user to create a digital project by using multi-media information, such as images and texts. The user can save the digital project via the digital-project software, or restart the digital project to continue editing it or to share it with other users. A so-called "project engine (PE)" is a core of the digital-project software, i.e. an engine of a bottom layer database. In the present invention, a so-called "PE file" hereinafter is a file built up according a format defined by the project engine (PE). The PE file uses file formats of executable codes, object codes, and dynamic-link libraries (DLLS) in operating systems. Basically, a data structure of the PE file format is used to encapsulate information of driving the executable codes or the object codes into the PE file, so that the executable codes or the object codes in the PE file can be processed by a loader of an operating system.

Furthermore, a so-called "exchangeable image file format (EXIF)" is an image-file format developed by Japan Electronic Industries Development Association (JEIDA) for being applied to digital cameras. The EXIF format can use traditional image-file formats including JPEG, TIFF Rev.6.0, RIFF WAVE and etc., but further add specific metadata tags on the image-file formats, wherein the metadata tags are defined in a standard of the EXIF format for saving the following data:

(1) Data and time information: recording current related data and time when a digital camera captures an image, and then saving the related data and time into the metadata tags;

(2) Settings of the digital camera: the settings include static information (such as a manufacturer name of the digital camera, and a model number) and other dynamic information which is various information changed with each captured image, such as orientation, aperture, shutter speed, focal length, metering mode, and ISO speed;

(3) Thumbnail: the thumbnail is a preview image used to show on a LCD display of a digital camera, a file manager, or a photo manipulation software; and (4) Related instruction and information.

The present invention is to provide a method for online printing a digital project according to properties and functions of the foregoing PE and EXIF file formats. Referring now FIG. 3, in a preferred embodiment of the present invention, the method is applied to a network system 40 which comprises at least one electronic device 41, a network 42, a network server 43, and a printer 44. The electronic device 41 is provided with a screen 410, and preferably selected from a personal digital assistant (PDA) or a notebook computer. The electronic device 41 is further installed with a digital-project software including a plurality of digital project templates therein. Each of the digital project templates is designed by professional designers according to different subjects, and each of the project templates can provide different objects, such as image, text, and frame. Referring now FIG. 4, a digital project template 45 provides an icon displayed on the screen 410 of the electronic device 41 for a user to click. After clicking the icon, the digital-project software shows the digital project template 45 on the screen 410 for being used as a drawing board. At this time, the user can set the paper size and the quality (i.e. printing size and resolution) of the drawing board via the digital-project software according to his/her favorite or need. Then, the user can attach at least one desired image 46 to the drawing board, so as to generate a processed project image 49, as shown in FIG. 4. Referring back FIG. 4, the user can further select to enter at least one paragraph of message 47 on the project image 49 via the digital-project software.

Figure 3:
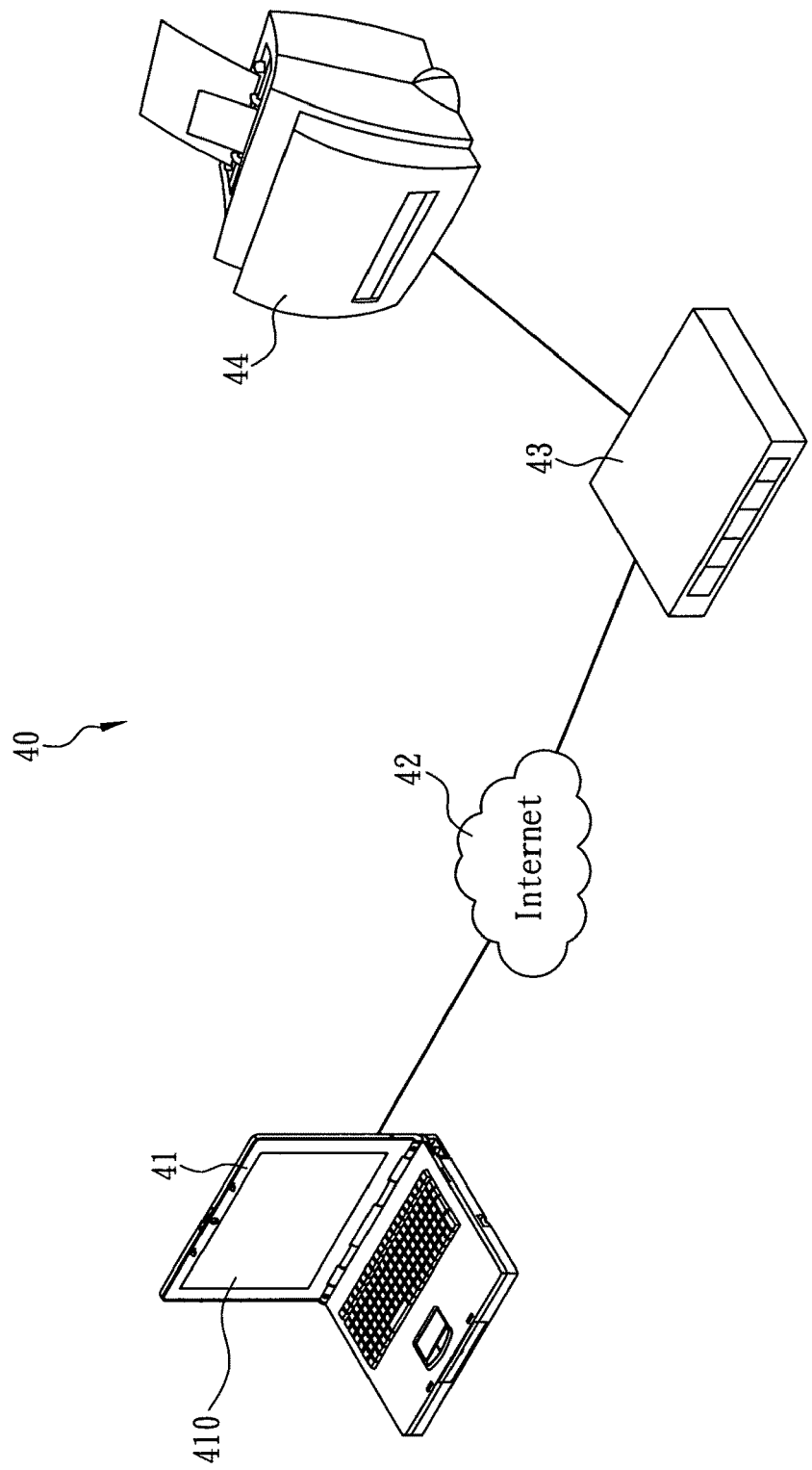
FIG. 3 is a system structure diagram of a method for online printing a digital project according to a preferred embodiment of the present invention.
Figure 4:
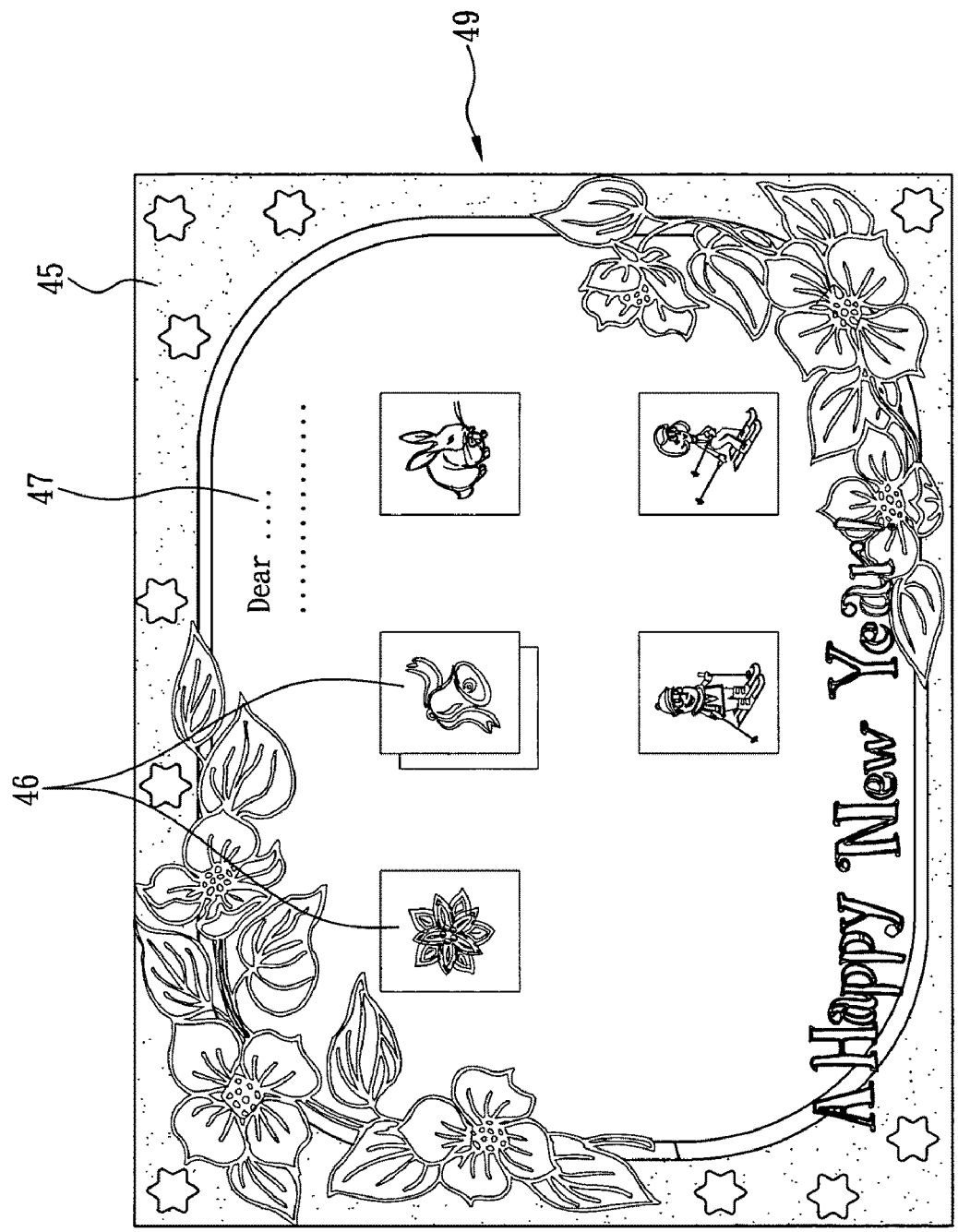
FIG. 4 is a schematic view of a project image generated by a digital-project software according to the preferred embodiment of the present invention.
Figure 5:
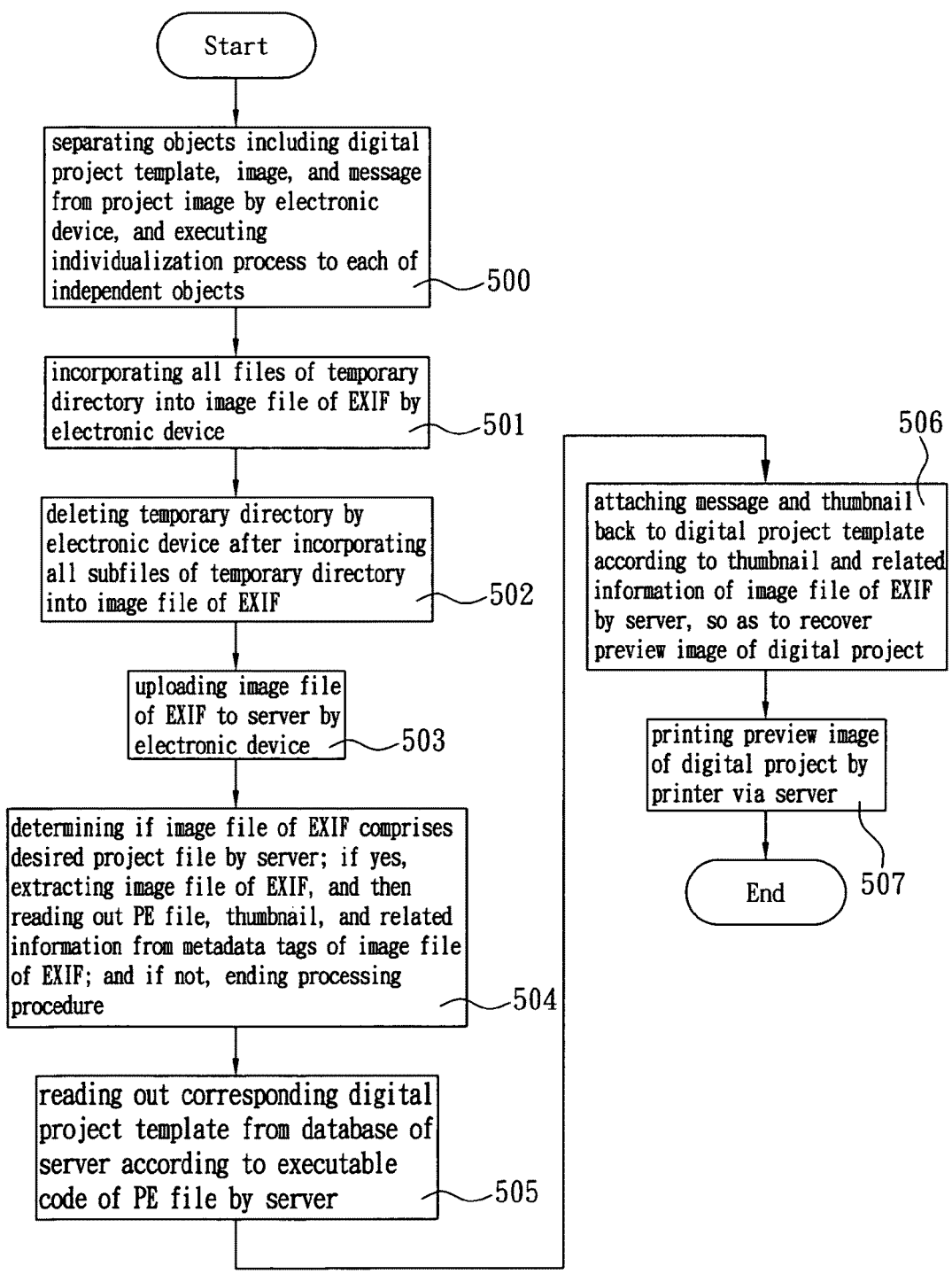
FIG. 5 is a flowchart of the method for online printing the digital project according to the preferred embodiment of the present invention.

Therefore, referring back FIGS. 3 and 4, the user creates a digital project via the digital-project software on the electronic device 41, wherein the digital project is the project image 49 comprising the digital project template 45, the at least one image 46, and the at least one paragraph of message 47. Referring now FIG. 5, the method of the present invention is used to process the project image 49 according to the following steps, for the purpose of speedily uploading the project image 49 having the best printing quality (such as the preview image of the project image 49) to the server 43 via the network 42, and then printing the project image 49 via the printer 44:

In step 500, firstly separating objects (such as the digital project template 45, the image 46, and the message 47) from the project image 49 by the electronic device 41, so that the digital project template 45, the image 46, and the message 47 will be independent objects separated from each other. Then, executing an individualization process to each of the independent objects, respectively. Except for a project file (i.e. a file of the digital project template 45), a project image (i.e. a file of the project image 49) further comprises a plurality of other related files to which the project file is linked, such as at least one file of the image 46. The project file and the related files are dispersedly saved in different locations of a hard disk of the electronic device 41. Basically, the user hardly knows how many files the project file is linked to, if no specific software tools are used. Thus, in the preferred embodiment of the present invention, all of the related files linked to the project file must be firstly copied from the hard disk of the electronic device 41, and then saved to a predetermined temporary directory, in order to separate each of the objects in the project image 49 (such as the digital project template 45, the image 46, and the message 47) from each other, for the purpose of executing the individualization process to each of the objects in the following steps, respectively:

(a) Directly deleting invisible or transparent objects from the project file;

(b) Converting the object of the message 47 which has a text type unsupported by the server into a corresponding text image, and then trimming the text image of the message 47 according to the printing size and resolution of the digital project template 45, in order to ensure that the image is positioned within a visible page area on the screen 410, and then to copy the text image of the message 47 to the predetermined temporary directory;

(c) Keeping the digital project template 45 (i.e. a file of an image object which is immobile in the digital project template 45) without copying it to the predetermined temporary directory, and replacing the digital project template 45 with a PE file. Then, encapsulating an executable code into the PE file, wherein the executable code is necessary for an operating system (also called OS hereinafter, such as WINDOWS or MAC) to generate the digital project template 45. Next, writing the PE file into the predetermined temporary directory;

(d) Determining if the image 46 attached to the digital project template 45 by the use has an original size greater than the size of a current occupied area of the image 46 on the page of the digital project template 45; if yes, converting the image 46 into at least one thumbnail; if the image 46 is not rotated in the project file, trimming a visible portion of the image 46, in order to reduce the file size of the image 46. Then, copying the thumbnail to the predetermined temporary directory; and (e) Writing information including a corresponding size and a corresponding coordinate location of the thumbnail in the digital project template 45 into the predetermined temporary directory.

In step 501, incorporating all files of the temporary directory into an image file of EXIF by the electronic device 41. However, it should be noted that a preview file of the project file is firstly needed to convert into the image file of EXIF, and then all files of the temporary directory are written into an image file of EXIF before incorporating. According to the present invention, there are two methods for writing all files of the temporary directory into the image file of EXIF. One of the methods is writing all subfiles of the temporary directory into metadata tags of the image file of EXIF in turn by using a self-defined metadata tag format; and the other of the methods is compressing all subfiles of the temporary directory by using a compression program (such as Zip), and then writing all compressed subfiles into metadata tags of the image file of EXIF, in order to further reduce the file size of the image file of EXIF. In the preferred embodiment of the present invention, the metadata tag format of the image file of EXIF comprises a file head, a file table, and binary data of all subfiles in turn;

In step 502, deleting the temporary directory by the electronic device 41 after incorporating all subfiles of the temporary directory into the image file of EXIF;

In step 503, uploading the image file of EXIF to the server 43 via the network 42 by the electronic device 41, as shown in FIG. 3;

In step 504, firstly determining if the image file of EXIF comprises a desired project file after the server 43 receives the image file of EXIF; if yes, extracting the image file of EXIF, and then reading out the PE file, the thumbnail, and the related information from the metadata tags of the image file of EXIF, in order to continue executing the following steps; and if not, ending the entire processing procedure;

In step 505, reading out a corresponding digital project template 45 from a database of the server 43 according to the executable code of the PE file by the server 43;

In step 506, attaching the message and the thumbnail back to the digital project template 45 according to the thumbnail and the related information of the image file of EXIF by the server 43, so as to recover a preview image of the digital project; and In step 507, printing the preview image of the digital project by the professional high-level printer 44 via the server 43, so as to generate a project with higher color brightness and higher pixel resolution.

When the electronic device 41 of the present invention uploads the project image 49 to the server 43 via the network 42, the objects (such as the image 46 and the message 47) of the project image 49 are processed to have a desired size according to the paper size of the digital project template 45 and the printing quality of the printer 44. Meanwhile, only the processed objects (such as the thumbnail and the message) are uploaded without uploading the original objects (such as image and message). Thus, it is unnecessary for the user to repeat to upload the digital project template 45 via the network, so as to substantially reduce the online transferred data size and the time of online uploading the project image 49, for the purpose of efficiently enhancing the efficiency of online printing the project image 49.

When executing the method of the present invention, the user can firstly select one of digital project templates from a digital-project software installed in an electronic device. Then, setting the paper size of the selected digital project template into 8.5×11 inches, and the printing quality thereof into 300 dpi. Next, the user selects to attach an image (dimension: 4×3 inches; resolution: 4M pixels; and file size: 0.8 MB) to the digital project template via the digital-project software. After the user finishes a project image, processing the project image according to the foregoing steps of the method of the present invention. Converting the project image into a thumbnail (resolution: 1200×900, i.e. 1M pixels; and file size: 200 KB) according to the desired paper size and printing quality. Then, writing the thumbnail and related information including a corresponding coordinate location of the thumbnail in the digital project template into an image file of EXIF. Next, uploading the image file of EXIF to a server via a network, and printing it via a printer. As a result, in comparison with the uploading size (0.8 MB) of completely uploading the original digital project template and the image thereon, the method of the present invention only needs to upload the image file of EXIF having a smaller uploading size about 200 KB, so as to substantially reduce the online transferred data size. Moreover, referring now FIG. 6, the method of the present invention can be applied to an electronic device installed with a different digital-project software for creating various different project images which can be uploaded to a server via a network, wherein the uploading time of online uploading the project images can be calculated according to the transferred data size thereof. As shown, the method of the present invention can substantially reduce the online transferred data size in comparison with the traditional method, so as to efficiently enhance the efficiency of online printing the digital project.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method for online printing a digital project, applied to a network system including at least one electronic device, a network, a network server, and a printer, the electronic device uploading a project image to the server via the network, the project image being printed via the printer, and the project image having a digital project template and at least one image, comprising steps of:

separating the image from the digital project template by the electronic device;

replacing the digital project template with an executable file [F8] by the electronic device, and encapsulating an executable code into the executable file, wherein the executable code is used to generate the digital project template;

converting the image into at least one thumbnail according to a predetermined printing size and quality by the electronic device;

writing the executable file, the thumbnail, and related information into an image file of an exchangeable image file format (EXIF) by the electronic device, wherein the related information includes a corresponding size and a corresponding coordinate location of the thumbnail in relation to the digital project template;

uploading the image file of EXIF to the server via the network by the electronic device;

extracting the image file of EXIF by the server, so as to read out the executable file, the thumbnail, and the related information carried by the image file of EXIF;

reading a corresponding digital project template from a database of the server according to the executable code of the executable file by the server;

attaching the thumbnail back to the digital project template according to the thumbnail and the related information in the image file of EXIF by the server, so as to recover a preview image of the digital project; and uploading the preview image to the printer, and printing the preview image by the printer.

2. The method of claim 1, further comprising: writing the executable file and the thumbnail into a predetermined temporary directory by the electronic device.

3. The method of claim 2, further comprising: writing all files of the temporary directory into the image file of EXIF by the electronic device.

4. The method of claim 3, further comprising: directly deleting invisible or transparent objects from the project image by the electronic device.

5. The method of claim 4, further comprising: writing information including a corresponding size and a corresponding coordinate location of the thumbnail in the digital project template into the predetermined temporary directory by the electronic device.

6. The method of claim 5, wherein the project image further comprises at least one message, and wherein the method further comprises: writing the message into the predetermined temporary directory by the electronic device.

7. The method of claim 5, wherein the project image further comprises at least one message, and wherein the method further comprises: converting the message into a corresponding text image by the electronic device if the message has a text type unsupported by the server, and copying the text image to the predetermined temporary directory.

8. The method of claim 6, further comprising: converting a preview file of the project file into the image file of EXIF, and then writing all files of the temporary directory into the image file of EXIF by the electronic device before writing all files of the temporary directory into the image file of EXIF.

9. The method of claim 7, further comprising: converting a preview file of the project file into the image file of EXIF, and then writing all files of the temporary directory into the image file of EXIF by the electronic device before writing all files of the temporary directory into the image file of EXIF.

10. The method of claim 8, further comprising: deleting the temporary directory by the electronic device after writing all files of the temporary directory into the image file of EXIF by the electronic device.

11. The method of claim 9, further comprising: deleting the temporary directory by the electronic device after writing all files of the temporary directory into the image file of EXIF by the electronic device.

* * * * *